Nov. 21, 1933.  H. L. BOYNTON  1,936,184
PITTING DEVICE
Filed Oct. 7, 1931
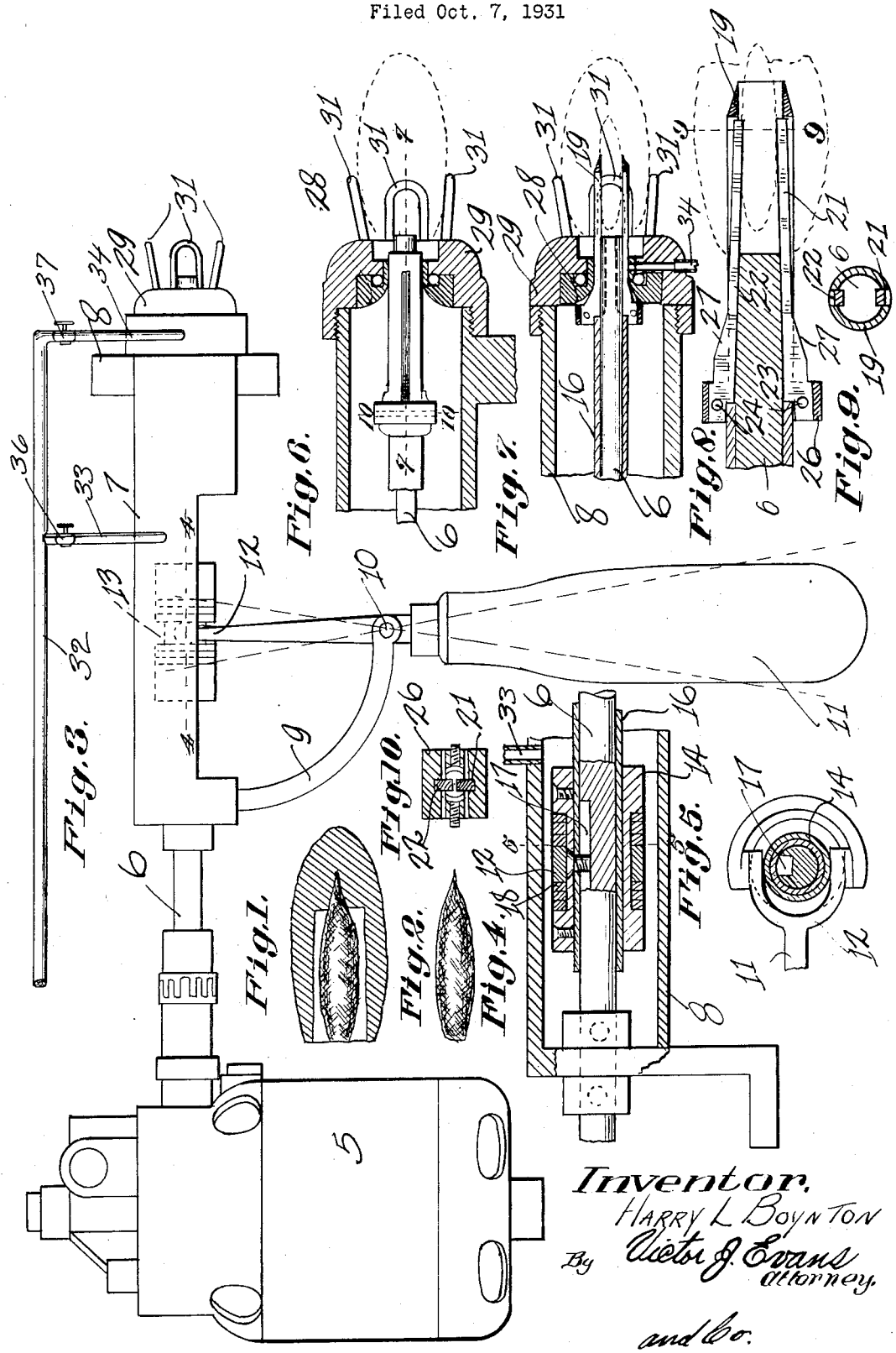
Inventor,
HARRY L BOYNTON
By Victor J. Evans
Attorney,
and Co.

Patented Nov. 21, 1933

1,936,184

UNITED STATES PATENT OFFICE 1,936,184

PITTING DEVICE

Harry L. Boynton, Hollywood, Calif., assignor of one-half to Harold Devenish Smith, Los Angeles, Calif.

Application October 7, 1931. Serial No. 567,490

3 Claims. (Cl. 146—17)

This invention relates to improvements in seeding or pitting devices and has particular reference to a device for removing the seeds or pits from dates and the like fruit.

A further object is to produce a device wherein the rotating parts will be lubricated with water so as to dissolve the sugar in the fruit and thus prevent heating of the rotating parts.

A further object is to produce a device of this character which will effectively remove the pit without mutilating the fruit.

A further object is to produce a device which is simple to operate and economical to manufacture.

A further object is to produce a device wherein the element of danger of the operator being injured, has been removed.

Other objects and advantages will be apparent during the course of the following description.

In the accompanying drawing forming a part of this specification and in which like numerals are employed to designate like parts throughout the same, Figure 1 is a cross-sectional view of a date showing the manner in which the seed or pit is cut away from the meat of the date, Figure 2 illustrates the pit after removal, Figure 3 is a side elevation of my tool, Figure 4 is an enlarged detail view partly in cross-section, of the knife actuating means, and taken on the line 4—4 of Fig. 3, Figure 5 is a cross-sectional view taken on the line 5—5 of Fig. 4, Figure 6 is an enlarged fragmentary sectional view of the pitter head showing the parts in retracted position, Figure 7 is a cross-sectional view taken on the line 7—7 of Fig. 6 with parts in extended position.

Figure 8 is an enlarged fragmentary detail view showing the pit gripping mechanism, Figure 9 is a cross-sectional view taken on the line 9—9 of Fig. 8, and Figure 10 is a cross-sectional view taken on the line 10—10 of Fig. 6.

The pitting of dates has been a very difficult task for the reason that the very nature of dates causes the knife to become rapidly gummed up and consequently only a straight knife could be employed, and even this had to be dipped in water very often in order to accomplish the clean cutting of the date. This cutting of the date also necessitated the cutting from end to end thereof, and to remove the seed, after which a filling was placed in the date, or the same used in any desired manner.

With applicant's device, it is possible to employ a tubular knife, that is, one which will enter the end of the date, cutting the seed free from the meat of the date, after which the seed is gripped and removed.

In the accompanying drawing wherein for the purpose of illustration is shown a preferred embodiment of my invention, the numeral 5 designates any desired form of power mechanism, here shown as a small motor, which is connected to a shaft 6, which shaft extends thru a head piece 7. This head piece is supported from any convenient point by a bracket 8, the supporting means not being shown. The head piece 7 has an arm 9 to which is pivoted as at 10 an operating handle 11. This handle carries a yoke 12 at its upper end, which yoke is adapted to travel in an annular groove 13 formed in a collar 14, which collar is secured to a tubular member 16. This tubular member is driven by the shaft 6 thru the medium of a groove 17 and pin 18. This tubular member 16 has a sharpened extremity 19 which may be termed the pitting knife (see Fig. 8). It will also be noted in this figure that a pair of pit grippers 21 and 22 are pivoted as at 23 and 24 respectively, to a block 26 mounted upon the tubular member 16. These pit grippers are each provided with a cam as shown at 27, which cams are adapted to contact a bearing member 28, (see Fig. 7) carried in the pitter head 29. This pitter head also carries positioning arms 31 surrounding the knife 19. It will here be noted that the end of the shaft 6 extends to a point slightly beyond the face of the pitter head, the purpose of which will be later seen.

At 32 I have shown a pipe having branches 33 and 34. In each of these branches is positioned a valve as shown at 36 and 37 respectively, which control the flow of water thru the pipe 32 to their respective branches. The branch 33 enters the bracket 8 and the branch 34 enters the pitter head 29 in such a manner as to permit a small quantity of water to drip onto the bearings, thus dissolving and carrying away any fruit sugar which would otherwise gum the device and cause a heating of the rotating parts.

The operation of my device is as follows:—

Assuming that the parts are in the position shown in the Figs. 3 and 6. As a date is brought against the pitter head 29 it will be positioned as illustrated in dotted lines in Fig. 6, contacting the positioning arms 31 and also the end of the revolving shaft 6. By now actuating the handle 11 so as to move the yoke 12, the result will be that the tubular member 16 will move to the position shown in Fig. 7. This movement of the tubular member projects the pitting knife into the date to a position surrounding the pit. This first action is to cut the meat away from the pit as illustrated in Fig. 1. A slightly further movement of the handle will cause the cams 27 to engage the bearing member 28 and will thus bring the grippers into engagement with the pit. By the revolving action of the cutter, the fibre adjacent the blossom end of the date, will be broken. The grippers then holding the pit will prevent the pit from rotating in the knife, and with the fibre of the pit being broken away, the pit is then free. The date is then removed from the pit. It is of course understood, that a date at this time is being held stationary by the hand of the operator. The date is then withdrawn from the pit. By now removing the meat, the pit will still be held in the device. As soon as the meat has been removed by the operator, the return of the handle 11 to its normal position will result in the pit coming into contact with the end of the shaft 6, thus releasing the grippers from the pit and permittting the pit to drop from the device.

It will thus be seen that the operation of pitting has been greatly simplified and that all the objects above set forth can be easily accomplished.

It is to be understood that the form of my invention herewith shown and described is to be taken as a preferred example of the same, and that various changes relative to the material, size, shape and arrangement of parts may be resorted to without departing from the spirit of the invention or the scope of the subjoined claims.

Having thus described my invention, I claim:—

1. In a pitting device, a support, a shaft rotatably mounted in said support, a tubular member longitudinally movable on said shaft and adapted to be rotated therewith, the cutting element carried by said tubular member, grippers carried by said tubular member and means for moving said grippers into gripping position when said tubular member is moved longitudinally on said shaft.

2. In a pitting device, a head piece, means for supporting said head piece, a shaft rotatable in said head piece, a tubular member slidably positioned on said shaft and adapted to be rotated thereby, means for longitudinally moving said tubular member on said shaft, a pitting head secured to said head piece, positioning arms carried by said head, and being readily positioned with respect to the axis of said shaft, grippers carried by said tubular member, a pitting knife carried by said tubular member and means for actuating said grippers when said tubular member has been projected through said head.

3. In a pitting device, a head piece, means for supporting said head piece, a shaft rotatable in said head piece, a tubular member slidably positioned on said shaft and adapted to be rotated thereby, means for longitudinally moving said tubular member on said shaft, a pitting head secured to said head piece, positioning arms carried by said head and being readily positioned with respect to the axis of said shaft, grippers carried by said tubular member, a pitting knife carried by said tubular member and means for actuating said grippers when said tubular member has been projected through said head, and means for lubricating and washing the rotating parts by conducting a fluid thereto.

HARRY L. BOYNTON.